Feb. 3, 1948.  B. C. MATHEWS  2,435,455
DEHYDRATING MACHINE WITH CONVEYORS PROVIDING
PLURAL TREATED MATERIAL PATHS
Filed May 22, 1944  5 Sheets-Sheet 4
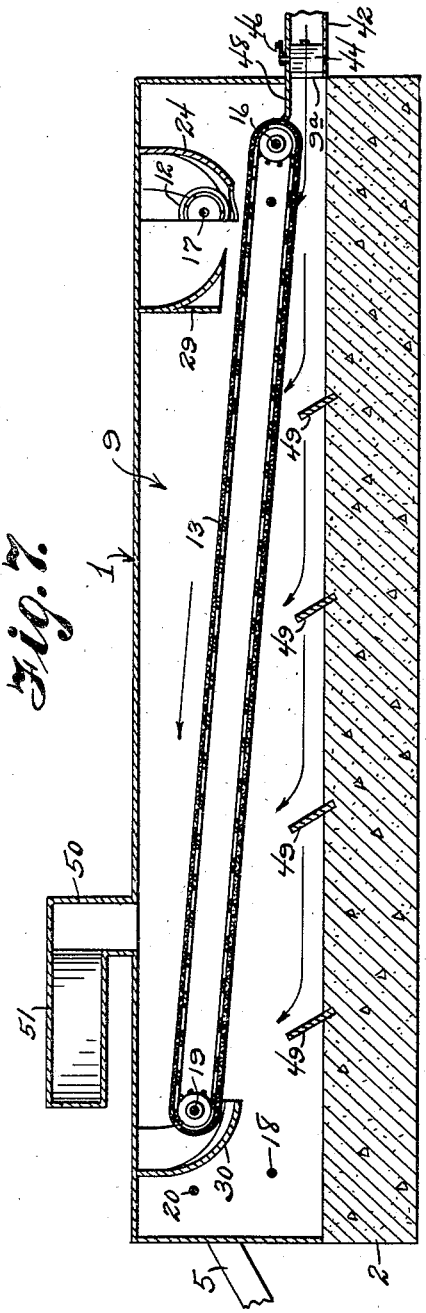
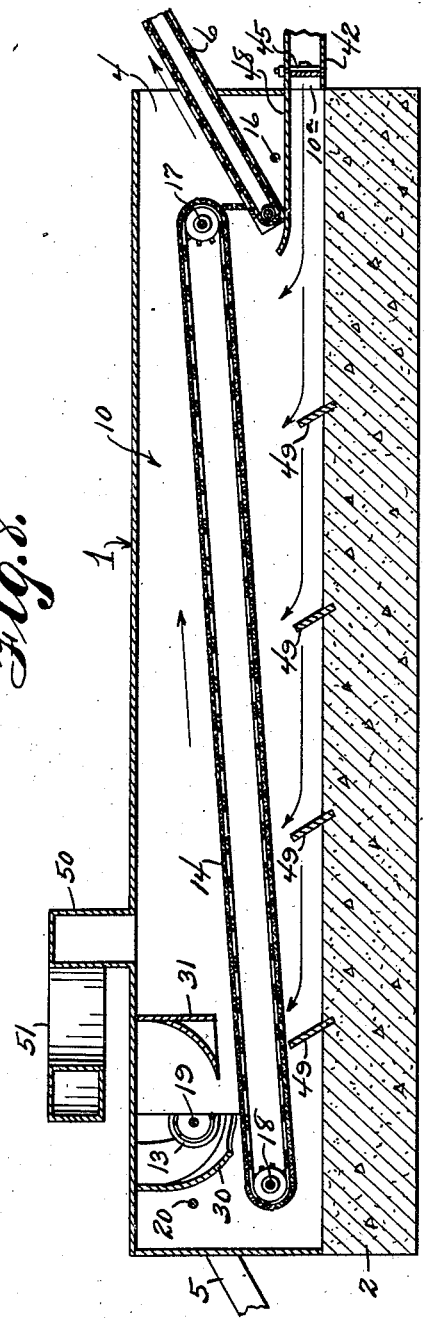
Bernard C. Mathews INVENTOR.
BY
*Victor J. Evans & Co.*
ATTORNEYS Feb. 3, 1948. B. C. MATHEWS 2,435,455
DEHYDRATING MACHINE WITH CONVEYORS PROVIDING
PLURAL TREATED MATERIAL PATHS
Filed May 22, 1944 5 Sheets-Sheet 5
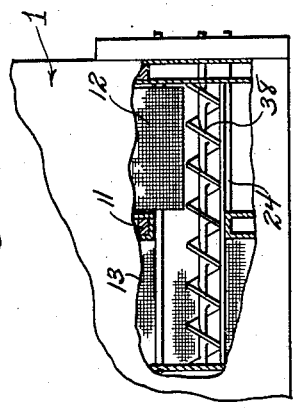
Fig. 12.
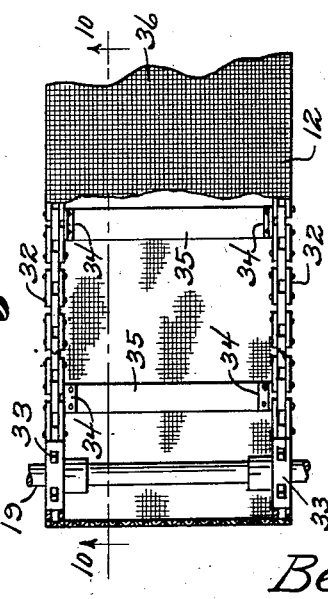
Fig. 9. Fig. 10.
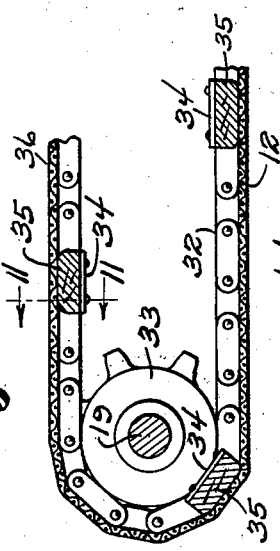
Fig. 13.
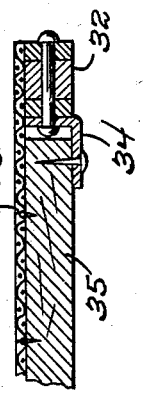
Fig. 11.
Fig. 14.
Bernard C. Mathews INVENTOR.
BY
*Victor J. Evans & Co.*
ATTORNEYS Patented Feb. 3, 1948

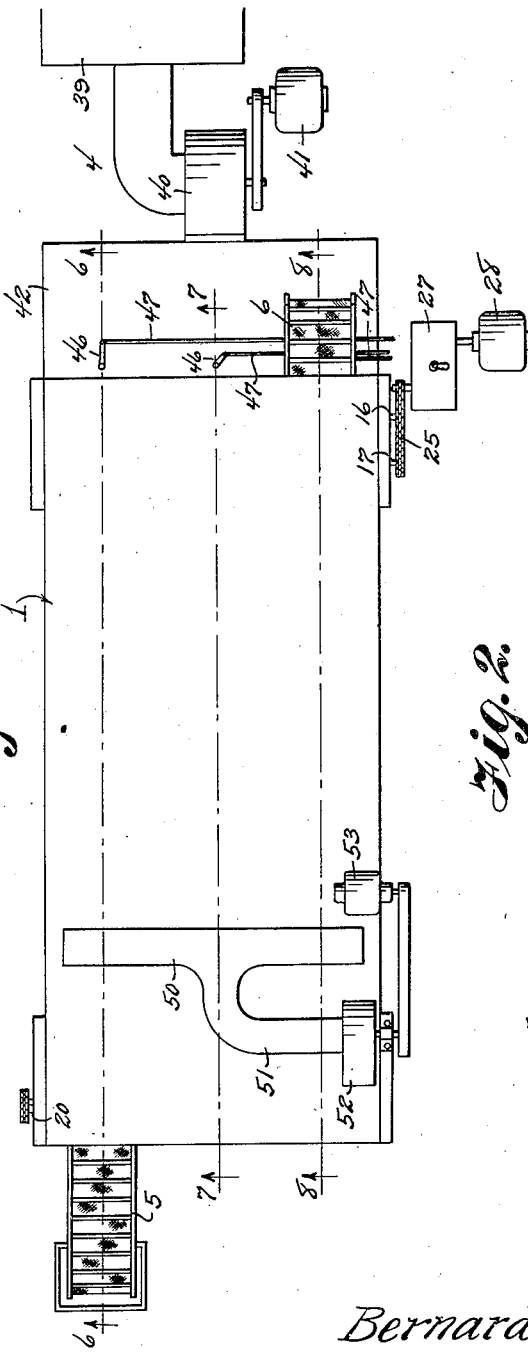

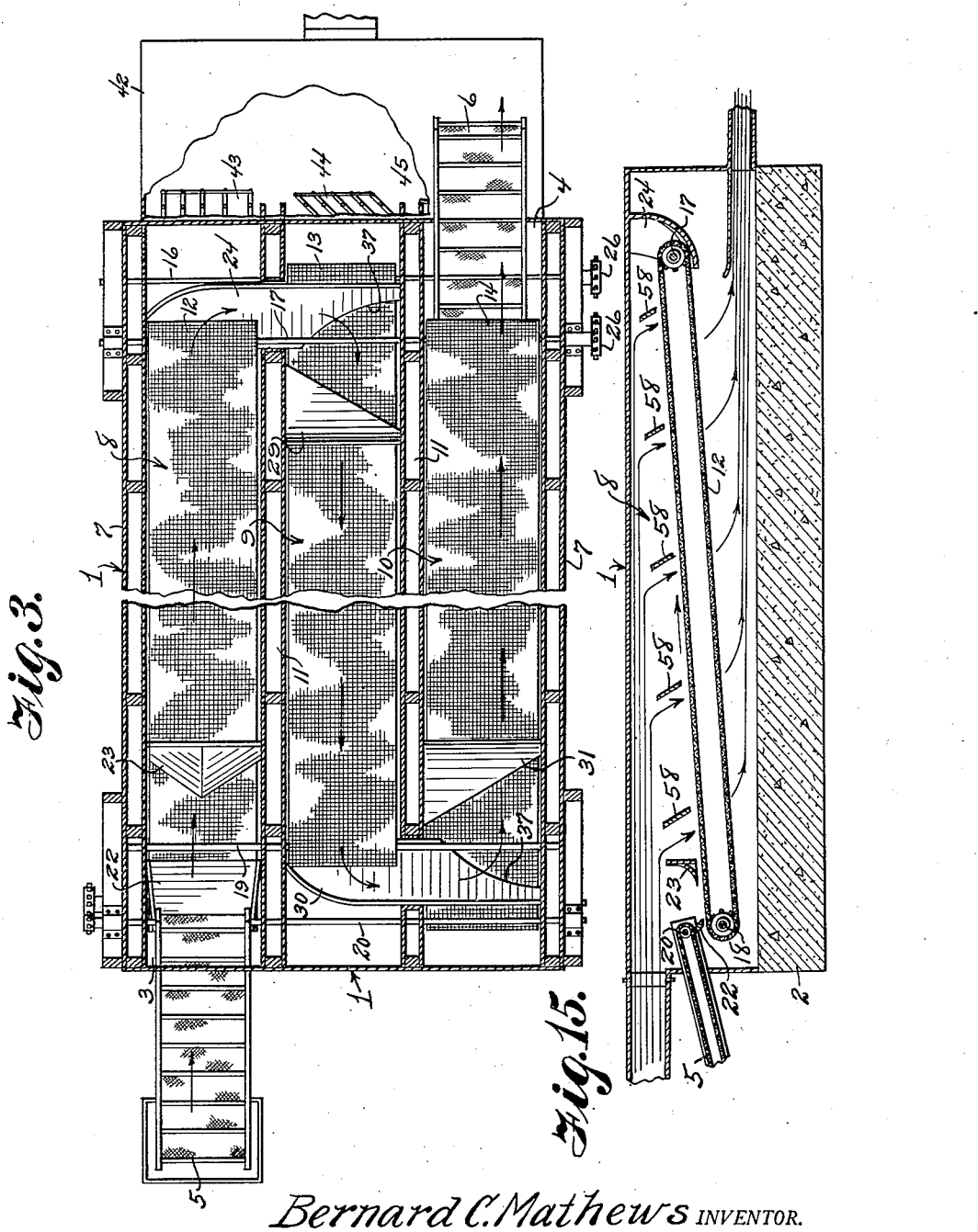

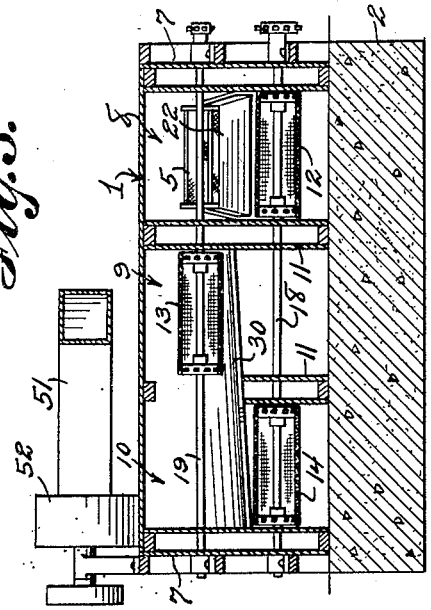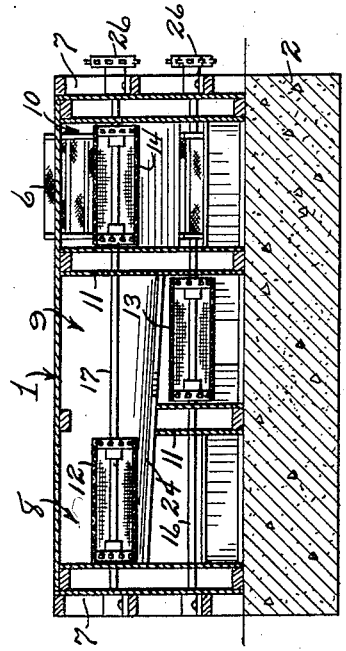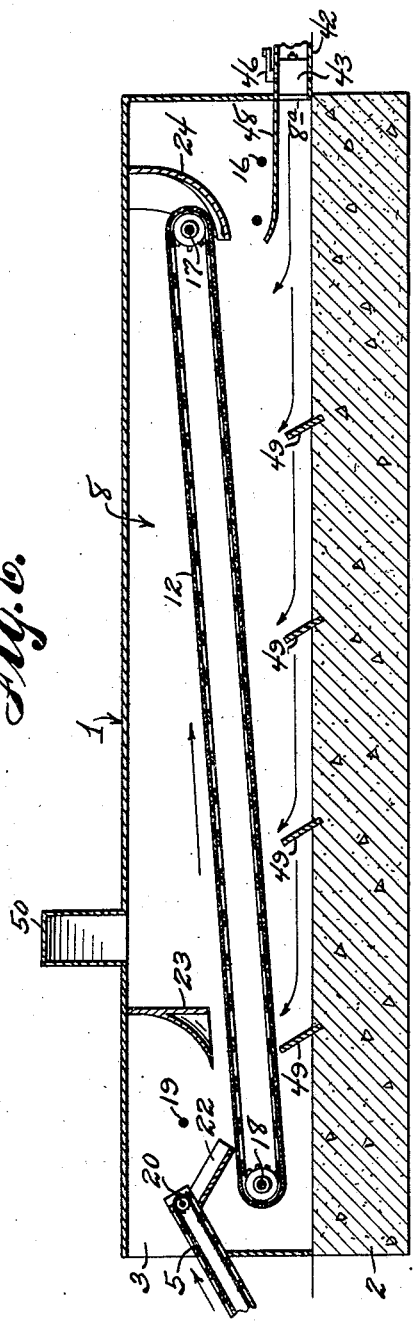

2,435,455

UNITED STATES PATENT OFFICE 2,435,455

DEHYDRATING MACHINE WITH CONVEYORS PROVIDING PLURAL TREATED MATERIAL PATHS

Bernard C. Mathews, Chicago, Ill.

Application May 22, 1944, Serial No. 536,793

5 Claims. (Cl. 34—203)

1

This invention relates to a dehydrator and it is one object of the invention to provide an apparatus of this character wherein material to be dried is moved along conveyors through which warm air passes, the conveyors being arranged in side by side relation to each other in a housing between an inlet and an outlet, and mechanism being provided for transferring the material from one conveyor to another.

Another object of the invention is to provide the housing with an air inlet so arranged that warm air entering the housing will be delivered to all of the chambers in which the conveyors are mounted and after passing upwardly through the conveyors be discharged from the housing through an air outlet.

Another object of the invention is to provide spreaders serving to evenly distribute the material upon the conveyors and thus assure even drying of the material as it moves along the conveyors.

Another object of the invention is to provide means for controlling flow of warm air through the housing and the chambers in which the conveyors are located and thus the heat to which the material is subjected as it moves through the housing between the inlet and the outlet.

Another object of the invention is to provide a dehydrator which is simple in construction, very compact, and not liable to get out of order and need repairs when in use.

The invention is illustrated in the accompanying drawings wherein:

Figure 1 is a top plan view of the improved dehydrator.

Figure 2 is a side elevation thereof.

Figure 3 is a horizontal sectional view taken longitudinally through the dehydrator along line 3—3 of Figure 2.

Figure 4 is a transverse sectional view taken along line 4—4 of Figure 2.

Figure 5 is a transverse sectional view taken along line 5—5 of Figure 2.

Figure 6 is a longitudinal sectional view taken vertically through the dehydrator along line 6—6 of Figure 1.

Figure 7 is a longitudinal sectional view taken along line 7—7 of Figure 1.

Figure 8 is a sectional view taken along line 8—8 of Figure 1.

Figure 9 is a fragmentary view showing an end portion of a conveyor partially in top plan and partially in section.

Figure 10 is a sectional view taken along line 10—10 of Figure 9.

2

Figure 11 is a fragmentary sectional view upon an enlarged scale taken along line 11—11 of Figure 10.

Figure 12 is a fragmentary view showing a modified form of mechanism for transferring material from one conveyor to another.

Figure 13 is a fragmentary view showing gates for controlling flow of air through the chambers in which the conveyors operate.

Figure 14 is a sectional view taken along line 14—14 of Figure 13.

Figure 15 is a view similar to Figure 6 showing a modified arrangement of parts.

This improved dehydrator has a housing or casing 1 which rests upon a foundation 2 and has an inlet 3 at one end and an outlet 4 at its other end. An endless conveyor 5 is provided for delivering material through the inlet 3 into the housing and an endless conveyor 6 serves to discharge the dried material from the housing through the outlet 4. While these conveyors have been shown as conveyors of the endless belt type it will be understood that other types of conveyors may be used in place of them. The side walls 7 of the housing are of hollow double-walled formation, as shown in Figures 3, 4 and 5, and in order to divide the housing into a plurality of chambers 8, 9 and 10, there have been provided partitions 11 which are also of double-walled formation. While there have been shown two partitions dividing the housing into three chambers it will be obvious that any number of chambers may be provided by installing the proper number of partitions.

In order to transport material to be dried through the chambers of the housing there have been provided wire mesh conveyors 12, 13 and 14. These conveyors extend longitudinally in the chambers and are trained about sprockets 15 carried by shafts 16, 17, 18 and 19. The conveyor 12 which operates in chamber 8 is disposed at an incline with its lower end under the inner end of the feed conveyor 5 which has its inner portion trained about sprockets carried by a shaft 18 which receives rotary motion from a chain, not shown, trained about sprocket wheels carried by the shafts 18, 19 and 20. A chute 22 extends downwardly from the inner end of the feed conveyor with its lower end overlying the lower end portion of the conveyor 12 so that the material will be deposited thereon without bruising and in order that the material will be evenly distributed upon conveyor 12 there has been provided a spreader 23 mounted in chamber 8. This spreader is tapered, as shown in Figure 3, and spaced upwardly from the conveyor, as shown in Figure 6, so that as the material is spread it may pass under the spreader. As the material reaches the upper end of conveyor 12 it is delivered into a trough 24 extending transversely thereof and into compartment 9 at a downward incline so that the partially dried material is deposited upon the lower end of the conveyor 13 which extends longitudinally in chamber 9 at an upward incline towards the inlet end of the housing.

The conveyor 13 is trained about sprockets carried by shafts 16 and 19 and in order that shafts 16 and 17 may be driven, one from the other, there has been provided a sprocket chain 25 engaged with sprocket wheels 26 carried by shafts 16 and 17 and also engaging and trained about a sprocket wheel on the power takeoff shaft of a transmission 27 through the medium of which rotary motion is transmitted from a motor 28. After the material enters chamber 9 and is deposited upon the conveyor 13 it is distributed thereon by a spreader 29. The conveyor 13 extends at an upward incline towards the inlet end of the housing and as the partially dried material reaches its upper end it is delivered to the trough 30 which is mounted transversely through the chamber and extends at a downward incline into chamber 10 where it is deposited upon the lower end portion of the conveyor 14. The conveyor 14 extends at an upward incline towards the discharge end of the housing and as the material moves with this conveyor it is evenly distributed thereon by the spreader 31. It will thus be seen that the material is moved through the housing by a series of conveyors moving in opposite directions and is transferred from one conveyor to another by troughs passing through the partitions 11 and upon reaching the upper end of conveyor 14 it is delivered onto conveyor 6 which is driven from the chain 25 and extends at an upward incline through the outlet 4 so that a receptacle to receive the dried material may be disposed under its outer end.

The conveyors are of duplicate construction and each is formed as shown in Figures 9, 10 and 11. Referring to these figures it will be seen that each conveyor consists of side chains 32 trained about sprocket wheels 33 carried by the various shafts. Brackets 34 are secured to certain links of the chains and project from inner sides thereof, and to these brackets are secured ends of cross bars or slats 35 to which screening 36 is secured. The screening is of such width that side edge portions thereof overlie and cover the chains, and referring to Figure 3 it will be seen that each conveyor extends the full width of the chamber in which it is mounted. Since the conveyors consist of side chains connected by cross bars and carrying strips of screening air may pass freely through the conveyors and act upon material resting thereon to gradually dry the material as it passes back and forth through the housing between the inlet and the outlet where it is discharged by the conveyor 6 into a suitable receptacle or conveyance for transporting it to a place of use or place where it is stored or packaged.

While there have been shown inclined troughs for delivering the material from one conveyor to another and each trough has its lower end portion cut away at one side, as shown at 37, so that as the material slides along the troughs it may drop therefrom onto the lower end of the next conveyor, additional means may be provided to move the material through the troughs and prevent it from becoming caught and failing to pass through the troughs. Such means is illustrated in Figure 12 and consists of a spiral conveyor 38 extending longitudinally in the troughs and rotatably mounted for turning movement so that as material drops into the troughs it will be positively moved through the troughs and discharged therefrom onto lower ends of the succeeding conveyors.

The material passing through the housing is dried by warm air which passes upwardly through the conveyors. This air is drawn from a heater 39 by a fan 40 driven from a motor 41. The outlet of the fan is secured about the inlet of a box or manifold 42 which is secured against the housing at the outlet end thereof and communicates with the compartments 8, 9 and 10 through openings 8a, 9a and 10a formed in the lower portion of the end wall of the housing. It is important that flow of warm air into the chambers be controlled, and this is done by controlling the volume of heated air admitted to each chamber and thus the temperature can be lowered as the moisture contents of the material reduces by decreasing the volume of heated air admitted thereto. This reduction of temperature is necessary in order to prevent the material from being scorched as it dries and also in order to preserve the valuable properties of the original food structure of the material. In order to control flow of hot air from the box 42 into the chambers there have been provided sets of shutters 43, 44 and 45 which are pivotally mounted for turning movement to closed and opened positions. The shutters of each group turn together and one shutter of each group has its pivot pin extending upwardly through the top of the box and carrying a crank 46 to which a rod 47 is attached. The rods extend transversely of the box and project from one side thereof so that they may be grasped and shifted longitudinally for opening or closing the shutters. It will thus be seen that the shutters 43 may be fully opened, as shown in Figure 3, to allow a full volume of hot air to enter chamber 8, the shutters 44 partially opened to allow a reduced volume of air to enter chamber 9, and shutters 45 slightly opened to allow only a small amount of air to enter chamber 10. The upper wall of the box has extensions 48 which project into the chambers and constitute deflectors for directing incoming air under the conveyors and in order to direct the air upwardly through the conveyors there have been provided plates 49 which extend transversely in the chambers and project upwardly from the foundation at an incline. It has been found that in the dehydration of some products, better results are attained by using the higher temperatures when such products are nearest dryness. This can be accomplished by proper manipulation of the dampers.

Referring to Figures 6, 7 and 8 it will be seen that as the hot air moves longitudinally through the chambers under the conveyors, portions of the air will be progressively deflected upwardly and act upon material to dry the same as the material passes through the housing from the inlet to the outlet. The air after passing upwardly through the conveyors leaves the chambers through outlet openings in the top wall of the housing and into an outlet manifold 50 extending transversely across the top of the housing and having its neck 51 connected with an exhaust fan 52 which is mounted upon the housing and driven by a motor 53. Since the hot air is driven into the chambers by fan 41 and sucked from the chambers by fan 52 a very good circulation of air through the chambers is created and material will be quickly dried as it moves through the chambers.

Instead of providing groups of shutters for controlling flow of air into the chambers single doors may be provided. These doors 54 are shown in Figures 13 and 14 and each consists of a metal plate disposed vertically and slidably mounted in tracks 55 at opposite sides of the chamber. The doors are drawn upwardly when moved to an opened position and each is formed with lines of openings 56 in order that pins 57 may be passed through the doors and support them in vertically adjusted positions.

In Figure 15 there has been shown a modified arrangement of parts. In this embodiment of the invention parts identical with those already described are identified by corresponding numerals. Each compartment has therein a conveyor of foraminous material in order that air may pass through it and the air moves longitudinally through the compartments but the inlet and the outlet openings for the air are so arranged that the air moves downwardly through the conveyors instead of upwardly, the air being directed through the conveyors by deflectors 58 corresponding to the deflectors 49 but located over the conveyors instead of under them. Since the air passes downwardly through a conveyor instead of upwardly material will be urged downwardly instead of upwardly and will not be blown off of the conveyors during its movement through the chambers.

Having thus described the invention, what is claimed is:

1. A dehydrating apparatus comprising a housing partitioned to form longitudinally extending chambers in side by side relation to each other, said housing having an inlet at one end communicating with a chamber at one side of the housing and an outlet at its other end communicating with the chamber at the other side of the housing, conveyors of foraminous material in said chambers each having a receiving end and a discharge end extending longitudinally thereof moving in opposite directions with relation to each other and each extending at an upward incline from its receiving end to its discharge end, troughs passing through the partitions for delivering material from discharge ends of the conveyors to receiving ends of adjoining conveyors, a box at one end of said housing communicating with the end of said chambers, a fan means for delivering hot air into the chambers under said conveyors through said box, deflector plates in said chambers extending transversely across the chambers and disposed at an incline for deflecting the hot air upwardly through the conveyors, means for controlling the flow of air from said box into said chambers, a manifold extending across the housing adjacent the other end thereof from the box and communicating with the chambers above the conveyors and means for withdrawing air from the chambers above said conveyors through said manifold.

2. A dehydrating apparatus comprising a housing partitioned to form longitudinally extending chambers in side by side relation to each other, conveyors of foraminous material in said chambers each having a receiving end and a discharge end, troughs passing through the partitions for delivering material from discharge ends of the conveyors to receiving ends of adjoining conveyors, a box at one end of said housing communicating with said chambers below the conveyors, means for delivering hot air into said box, shutters for controlling flow of hot air from said box into said chambers and thereby regulating temperature of air in the chambers, and means adjacent the opposite end of said housing for withdrawing air from the chambers above the conveyors.

3. A dehydrating apparatus comprising a housing partitioned to form longitudinally extending chambers in side by side relation to each other, conveyors of foraminous material in said chambers each having a receiving end and a discharge end, troughs passing through the partitions for delivering material from discharge ends of the conveyors to receiving ends of adjoining conveyors, a box at one end of said housing communicating with said chambers below the conveyors, a heater, a pump for withdrawing hot air from the heater and delivering the same to said box, shutters for controlling flow of air from said box into said chambers independently adjustable whereby temperature of air in the chambers may be regulated, and a pump for withdrawing air from the chambers above the conveyors.

4. A dehydrating apparatus comprising a housing partitioned to form chambers in side by side relation to each other, conveyors in said chambers moving in opposite directions and each extending at an upward incline from its receiving end to its discharge end, troughs passing transversely through the partitions and each extending at a downward incline from the discharge end of a conveyor to the receiving end of an adjoining conveyor, spreaders in said chambers adjacent receiving ends of the conveyors for distributing material upon the conveyors, mechanism for delivering hot air into said chambers, deflectors in said chambers for directing air through said conveyors, and mechanism for withdrawing air from said chambers after passing through the conveyors.

5. A dehydrating apparatus comprising a housing partitioned to form longitudinally extending chambers in side by side relation to each other, conveyors in said chambers moving in opposite directions and each extending at an upward incline from its receiving end to its discharge end, tapered spreader mounted in said chambers over but upwardly from said conveyors to spread the material as it passes under said spreader, auxiliary conveyors for transferring material from discharge ends of the conveyors to receiving ends of adjoining conveyors, a box at one end of said housing communicating with ends of said chambers under the conveyors therein, means for delivering hot air into said box, sets of shutters in said box pivotally mounted for movement into and out of closing relation to openings between the box and said chambers, certain of said shutters having turning handles above said box, rods connected with said handles for turning the shutters and independently controlling flow of hot air into said chambers, and means adjacent the other end of said housing for withdrawing air from the chambers.

BERNARD C. MATHEWS.

(References on following page)

REFERENCES CITED

The following references are of record in the file of this patent:

UNITED STATES PATENTS

| Number | Name | Date |
|---|---|---|
| 554,838 | Schrebler | Feb. 18, 1896 |
| 2,275,588 | Greene | Mar. 10, 1942 |
| 1,481,790 | Buckham | Jan. 29, 1924 |
| 1,328,396 | Rea et al. | Jan. 20, 1920 |
| 1,744,884 | Greiner | Jan. 28, 1930 |
| 1,484,629 | Eberhart et al. | Feb. 26, 1924 |
| 1,071,269 | Sibson et al. | Aug. 26, 1913 |
| 376,546 | Pond | Jan. 17, 1888 |
| 596,470 | Blanchard | Jan. 4, 1898 |
| 1,392,794 | Putnam et al. | Oct. 4, 1921 |
| 1,515,596 | Harris | Nov. 18, 1924 |

FOREIGN PATENTS

| Number | Country | Date |
|---|---|---|
| 56,934 | Sweden | June 17, 1924 |